United States Patent [19]
Goldhaft

[11] 3,949,511
[45] Apr. 13, 1976

[54] KEY HOLDERS FOR INSTANT FISHING

[76] Inventor: Morris Goldhaft, 8100 Shorefront Parkway, Rockaway Beach, N.Y. 11693

[22] Filed: Jan. 22, 1975

[21] Appl. No.: 543,021

[52] U.S. Cl. ................... 43/20; 43/43.16; 43/43.6; 43/44.83; 43/57.5 R
[51] Int. Cl.² ................. A01K 83/00; A01K 97/06
[58] Field of Search ......... 43/54.5, 57.5, 43.4, 43.6, 43/43.2, 43.16, 17.2, 20, 44.83; 70/459

[56] References Cited
UNITED STATES PATENTS

| | | | |
|---|---|---|---|
| 2,234,516 | 3/1941 | Clark | 43/43.6 |
| 3,180,053 | 4/1965 | Norton et al. | 43/57.5 |
| 3,296,730 | 1/1967 | Leverdingen | 43/17.2 |
| 3,302,320 | 2/1967 | Breeden | 43/54.5 |

*Primary Examiner*—Warner H. Camp
*Attorney, Agent, or Firm*—Richard L. Miller

[57] ABSTRACT

A novel key holder that is readily convertible so to be used as fishing gear for catching fish; the key holder consisting of a key ring attached to one end of a leash which at its other end is attached to a case for storing lures and flies; the key ring in a closed position serving to retain keys, and in an opened position forming a fish hook, and one end of the case being interchangably attachable either to a cap that has a beaded chain for retaining additional keys or being attachable to a reel unit in which fishing line is wound up around a spindle; the fishing line being directly attachable to the leash after detachment of the case from the leash, so to lower the fish hook in the water during fishing operation.

3 Claims, 8 Drawing Figures

U.S. Patent April 13, 1976 3,949,511
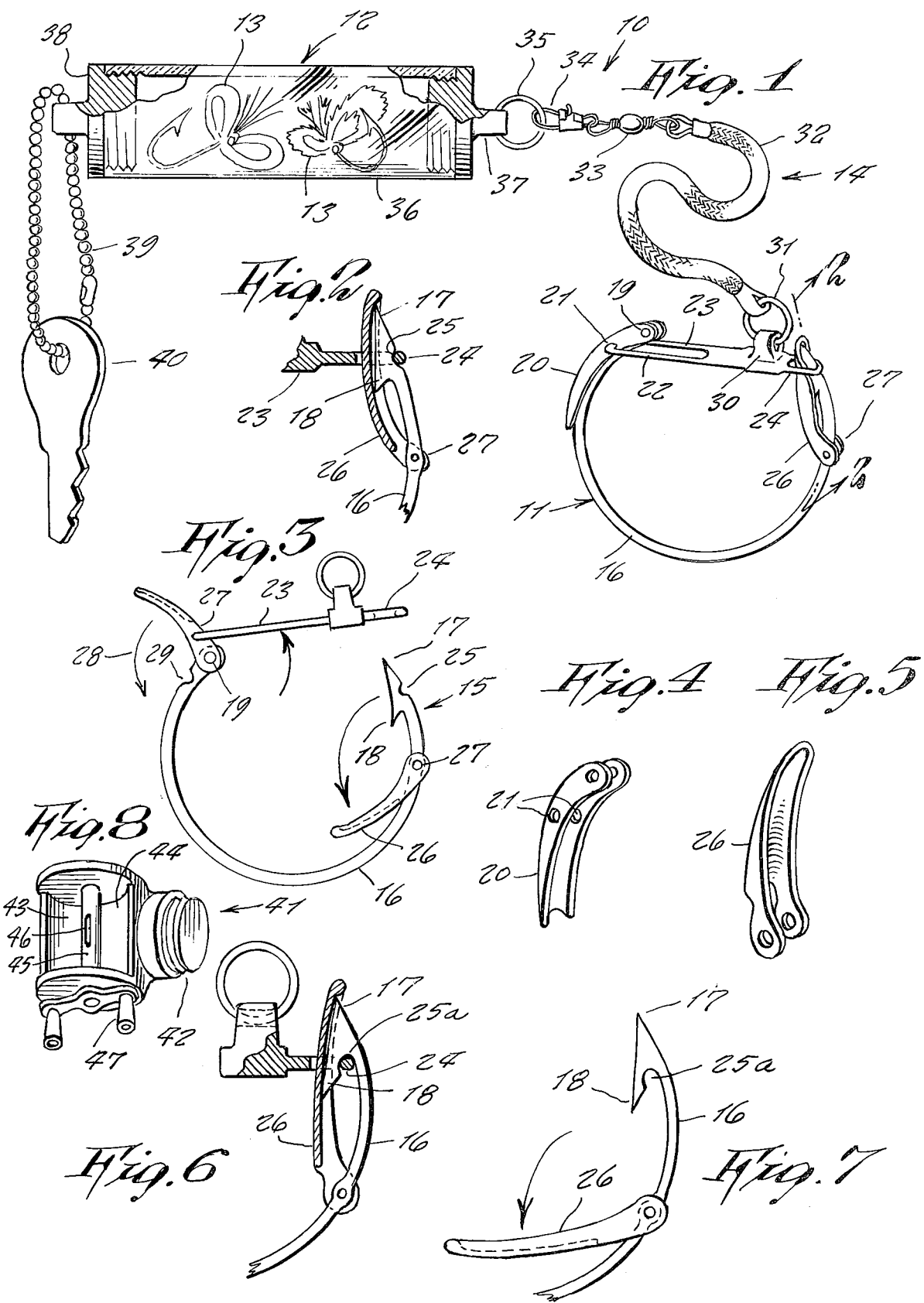

KEY HOLDERS FOR INSTANT FISHING

This invention relates generally to key holders.

A principle object of the present invention is to provide a novel key holder which is readily adjustable so that it may be converted into fishing gear, for catching fish.

Another object accordingly is to provide a key holder which always permits a person to carry fishing gear as long as he has his key holder with him.

Another object is to provide a key holder which would take up no more space in a person's pocket or purse than a conventional key holder which might have a penlite secured thereto.

Still another object is to provide a key holder which incorporates a fish hook, a case for fishing lures and flies, and also a fishing line reel.

Other objects are to provide a key holder for instant fishing which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention shown partly in cross section.

FIG. 2 is a fragmentary cross sectional view taken on line 2—2 of FIG. 1.

FIG. 3 is a side view of the key ring shown opened up.

FIG. 4 is a perspective view of one lever thereof.

FIG. 5 is a perspective view of a fish hook shield.

FIG. 6 is a view similar to FIG. 2 showing a modified construction, as showing the hook shielded.

FIG. 7 is a side view thereof with the fish hook in exposed position.

FIG. 8 is a perspective view of a fishing line reel unit.

Referring now to the drawings in detail, the reference numeral 10 represents a key holder for instant fishing according to the present invention wherein there is a key ring 11 tethered to cylindrical case 12 that is used for storage of fishing lures and flies 13. The key ring is attached to the case by a leash 14.

In the present invention, the key ring 11 is designed to be convertible into a fishing hook 15 whenever so wished.

The key ring consists of an arcuate rod 16 made of stiff steel wire and which at one end is tapered to a point 17 and having a nearby barb 18 so to resemble a conventional fish hook end. The other end of rod 16 is pivotally attached by a pin 19 to one end of a lever 20 which is channeled and longitudinally arcuate so that it can nest against the outer periphery of rod 16 when pivoted thereagainst. Aligned transverse openings 21 through a longitudinally intermediate portion of the lever pivotally receive one end loop 22 of a bar 23. A loop 24 at the opposite end of the bar is adaptable to swing down over the point 17 and snap fit into a notch 25 along the outer peripheral edge of rod 16 and which is located relatively close to the point. A shield 26 having a longitudinal channel is pivotable about a pin 27 supported on rod 16 so that in one pivoted position, it encloses the point 17 and pointed barb 18 so that there is no danger of them piercing any object. The loop 24 is formed around a loop opening that is sufficiently large enough to also receive an end of the shield 26 that encloses the point and barb, as shown in FIG. 1. When thus the bar 23 bridges across the opposite ends of the rod 16, the key ring 11 is closed so that keys, not shown, can be retained thereupon. However, when the bar is removed from notch 25 and is pivoted as shown by arrow 28, the key ring rod 16, point 17 and barb 18 then instantly becomes the fish hook 15, as shown in FIG. 3. It is to be noted that a notch 29 along rod 16 is provided to clear the loop 22 of bar 23 where it extends between openings 21.

The bar 23 includes an eyelet 30 along an intermediate portion thereof to which the leash 14 is connected. The leash consists of a metal ring 31 connecting between the eyelet and one end of a flexible, woven rope 32 made either of leather, plastic or other material. The other end of the rope is connected to one end of a swivel 33, and other end of which is connected to a connector 34 that is removably attachable to a metal ring 35 supported on the case 12.

The case consists of a tube 36 made preferably of transparent plastic so to allow view of the lures and flies carried therein; the opposite ends of the tube being threaded so to removably engage end caps 37 and 38. Each cap has an eyelet integral therewith, the eyelet of cap 37 engaging the ring 35, while the eyelet of cap 38 receives an endless bead chain 39 from which keys 40 may be retained.

As shown in FIG. 8, the above described cap 38 may be replaced by a fishing line reel unit 41 that includes a threaded protrusion 42 engagable with a threaded end of the tube. The unit 41 includes a cylindrical central cavity 43 that is accessible through a side opening 44. A rotatable spindle 45 is supported along a central axis of the cavity and has a transverse slot 46 so one end of a fishing line can be inserted for securement thereto, and thus allow the line to wind up around the spindle. A hand crank 47 is affixed on one outward protruding end of the spindle so to allow easy manual turning of the spindle in order to wind up the line therearound.

In FIGS. 6 and 7 a modified construction of the invention shows a notch 25a located in a crotch of the barb 18 and rod 16, instead of the above described notch 25, and which serves a same purpose.

In operative use, it is now evident that the device can be used for holding keys, and which otherwise is readily convertible into fishing gear.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a key holder for instant fishing, the combination of a key ring attached to one end of a leash and the other end of said leash being connected to a case for storing fishing lures and flies, and said key ring incorporating means for being converted into a fish hook, wherein said key ring comprises an arcuate rod, a first end of said rod being tapered to a point, a barb formed near said point, and an opposite end of said arcuate rod having a lever pivotally attached thereto, said lever being pivotally attached to one end of a bar, an opposite end of said bar being engagable in a notch near said first end of said rod.

2. The combination as set forth in claim 1 wherein a shield is pivotally attached to said rod, said shield in one pivoted position enclosing said point and said barb, said shield in said pivoted position having one end thereof adjacent said point and fitted therewith into a looped opening formed on said opposite end of said bar.

3. The combination as set forth in claim 2 wherein said case comprises a transparent tube having a removable cap at each end, one said cap being attached to said leash, and the other said cap being interchangable with a reel unit having a rotatable spindle through a central cavity, means for one end of a fishing line being attachable on said spindle, and a hand crank on an outward end of said spindle.

* * * * *